(12) United States Patent
Gan et al.

(10) Patent No.: US 10,869,233 B2
(45) Date of Patent: Dec. 15, 2020

(54) METHOD FOR GATHERING SMALL CELLS

(71) Applicants: Alpha Networks Inc., Hsinchu (TW); Industrial Technology Research Institute, Hsinchu (TW)

(72) Inventors: Chai-Hien Gan, Muar (MY); Shu-Chieh Chang, Hsinchu (TW); Shih-Chi Lee, Hsinchu (TW)

(73) Assignees: ALPHA NETWORKS INC., Hsinchu (TW); INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 155 days.

(21) Appl. No.: 16/223,505

(22) Filed: Dec. 18, 2018

(65) Prior Publication Data

US 2020/0145885 A1 May 7, 2020

(30) Foreign Application Priority Data

Nov. 6, 2018 (TW) .............................. 107139404 A

(51) Int. Cl.
*H04W 36/00* (2009.01)
*H04W 16/32* (2009.01)
*H04W 36/38* (2009.01)
*H04W 36/04* (2009.01)

(52) U.S. Cl.
CPC ....... *H04W 36/0016* (2013.01); *H04W 16/32* (2013.01); *H04W 36/04* (2013.01); *H04W 36/385* (2013.01)

(58) Field of Classification Search
None
See application file for complete search history.

(56) References Cited

U.S. PATENT DOCUMENTS

| | | | |
|---|---|---|---|
| 2014/0198767 A1* | 7/2014 | Heo | H04W 72/00 370/331 |
| 2016/0277975 A1 | 9/2016 | Donepudi et al. | |
| 2017/0280504 A1 | 9/2017 | De Pasquale et al. | |
| 2018/0035334 A1 | 2/2018 | Lohar | |

FOREIGN PATENT DOCUMENTS

CN 106604343 4/2017

OTHER PUBLICATIONS

Taiwan Intellectual Property Office, "Office Action", dated Sep. 13, 2019.

* cited by examiner

*Primary Examiner* — Alex Skripnikov
(74) *Attorney, Agent, or Firm* — WPAT, PC

(57) ABSTRACT

A method for gathering small cells is provided. In the method, an instruction gathering device gathers connections of the small cells for transmitting control packets, and provides at least two virtual cells to process the connections. When a user device switches the connection to another small cell, the instruction gathering device also assigns another virtual cell to process the control packets related to the user device. The virtual cells partially replace contents of the control packets before forwarding the control packets.

19 Claims, 7 Drawing Sheets

| Cell code | End user device code | Server user device code | Core network code |
|---|---|---|---|
| HeNB 1 | eNB UE S1AP 1 | | GUMMEI |

FIG. 3A

| Cell code | End user device code | Server user device code | Core network code |
|---|---|---|---|
| HeNB 1 | eNB UE S1AP 1 | GW UE S1AP 1 | GUMMEI |

FIG. 3B

| Cell code | End user device code | Server user device code | Core network code |
|---|---|---|---|
| VeNB 1 | GW UE S1AP 1 | | GUMMEI |

FIG. 4A

| Cell code | End user device code | Server user device code | Core network code |
|---|---|---|---|
| VeNB 1 | GW UE S1AP 1 | MME UE S1AP 1 | GUMMEI |

FIG. 4B

| Cell code | End user device code | Server user device code | Core network code |
|---|---|---|---|
| HeNB 2 | eNB UE S1AP 2 | GW UE S1AP 1 | GUMMEI |

FIG. 6A

| End user device code | Core network code | Post-handover server user device code |
|---|---|---|
| eNB UE S1AP 2 | GUMMEI | GW UE S1AP 2 |

FIG. 6B

| Cell code | End user device code | Server user device code | Core network code |
|---|---|---|---|
| VeNB 2 | GW UE S1AP 2 | MME UE S1AP 1 | GUMMEI |

FIG. 7A

| End user device code | Core network code | Post-handover server user device code |
|---|---|---|
| GW UE S1AP 2 | GUMMEI | MME UE S1AP 2 |

METHOD FOR GATHERING SMALL CELLS

FIELD OF THE INVENTION

The present disclosure relates to a method for gathering small cells, and particularly to a method for gathering small cells by taking advantages of at least two virtual cells.

BACKGROUND OF THE INVENTION

In recent years, network information has changed greatly in types and sizes. Media (e.g. videos, games and live streams) requiring larger data packets are spread over the network. Hence, the network needs rapid handovers to provide high speed uplink and downlink (UL/DL). Compared to the conventional network architecture depending on macro cells, providing closely arranged small cells is a more efficient and cheaper solution for such demands, and lays the foundations for 5G system.

With the growth of the quantity of small cells, it is necessary for the core network to establish more S1/NG connections to control the small cells. Thus, building hardware and software of the core network causes greatly rising cost. Now, the small cell gateway is available for gathering and accommodating S1/NG interfaces of the small cells, so as to decrease the loading of the core network in the ultra dense network (UDN) environment.

Nevertheless, when the small cell gateway gathers all the data packets transmitted to or received from the user devices, loading of the small cell gateway is considerably heavy. It also raises the cost required for building the hardware and software of the small cell gateway. There is a tendency for the small cell gateway to gather only the control packets rather than data packets. However, the current handovers can not be applied to this new network architecture. A better collaborating method in the network architecture with a small cell gateway to provide individual transmission paths for the control packets and the data packets is an important issue.

SUMMARY OF THE INVENTION

An aspect of the present disclosure provides a method for gathering small cells adapted to be used with a network system. The network system includes at least one user device, at least two small cells, a core network device and an instruction gathering device providing at least two virtual cells. Control packets transmitted between the at least two small cells and the core network device pass through the instruction gathering device, and data packets transmitted between the at least two small cells and the core network device do not pass through the instruction gathering device. According to the method, when a handover notification control packet of the plurality of control packets notifies that an activated user device switches connection from a first small cell to a second small cell other than the first small cell, all pre-handover control packets of the control packets prior to the handover notification control packet passes through a first virtual cell, and all post-handover control packets of the control packets posterior to the handover notification control packet passes through a second virtual cell other than the first virtual cell. The virtual cells connected to the core network device are independent of each other so that the core network device processes connections from different virtual cells independently.

Another aspect of the present disclosure provides a method for gathering small cells. The method includes steps of: connecting the virtual cells to the core network device independently; a first virtual cell transmitting the control packets to the core network device when an activated user device establishes a first connection to a first small cell; and a second virtual cell taking over the first virtual cell for transmitting the control packets to the core network device when the activated user device establishes a second connection to a second small cell other than the first small cell. The first virtual cell and the second virtual cell are different virtual cells. The first virtual cell replaces contents related to the first small cell in the control packets with contents related to the first virtual cell, and transmits the replaced control packets to the core network device. The second virtual cell replaces contents related to the second small cell in the control packets with contents related to the second virtual cell, and transmits the replaced control packets to the core network device.

BRIEF DESCRIPTION OF THE DRAWINGS

The advantages of the present disclosure will become more readily apparent to those ordinarily skilled in the art after reviewing the following detailed description and accompanying drawings, in which:

FIG. 3A shows a portion of contents of a connection startup control packet based on SCTP according to an embodiment of the present disclosure;

FIG. 3B shows a portion of contents of a connection startup reply packet based on SCTP according to an embodiment of the present disclosure;

FIG. 4A shows a portion of contents of a connection startup control packet based on SCTP according to an embodiment of the present disclosure;

FIG. 4B shows a portion of contents of a core reply packet based on SCTP according to an embodiment of the present disclosure;

FIG. 6A shows a portion of contents of a handover notification control packet based on SCTP and transmitted from a small cell to the instruction gathering device according to an embodiment of the present disclosure;

FIG. 6B shows a portion of contents of a handover confirmation control packet based on SCTP and transmitted from the instruction gathering device to the small cell according to an embodiment of the present disclosure;

FIG. 7A shows a portion of contents of a handover notification control packet based on SCTP and transmitted from the instruction gathering device to the core network device according to an embodiment of the present disclosure; and FIG. 7B shows a portion of contents of a handover confirmation control packet based on SCTP and transmitted from the core network device to the instruction gathering device according to an embodiment of the present disclosure.

DETAILED DESCRIPTION OF PREFERRED EMBODIMENTS

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

A small cell is a low-powered radio access node or base station which supports lower power operation. When a mobile device is close to the small cell, it is authorized to access the network through the small cell. In the ultra dense network environment, many small cells are gathered together with several core network devices to provide network service for user devices within a limited range near the small cells. A transmission path for network packets should be established between each small cell and a core network device assigned to process the data related to the small cell. Thus, the number of the eS1/NG connections to the core network device increases because the number of the small cells in the ultra dense network is continuously growing. To solve this problem, a small cell gateway is used to gather and accommodate the S1/NG interfaces of small cells, and the small cell gateway is connected to the core network device to decrease the connections to the core network device.

Figure 1:
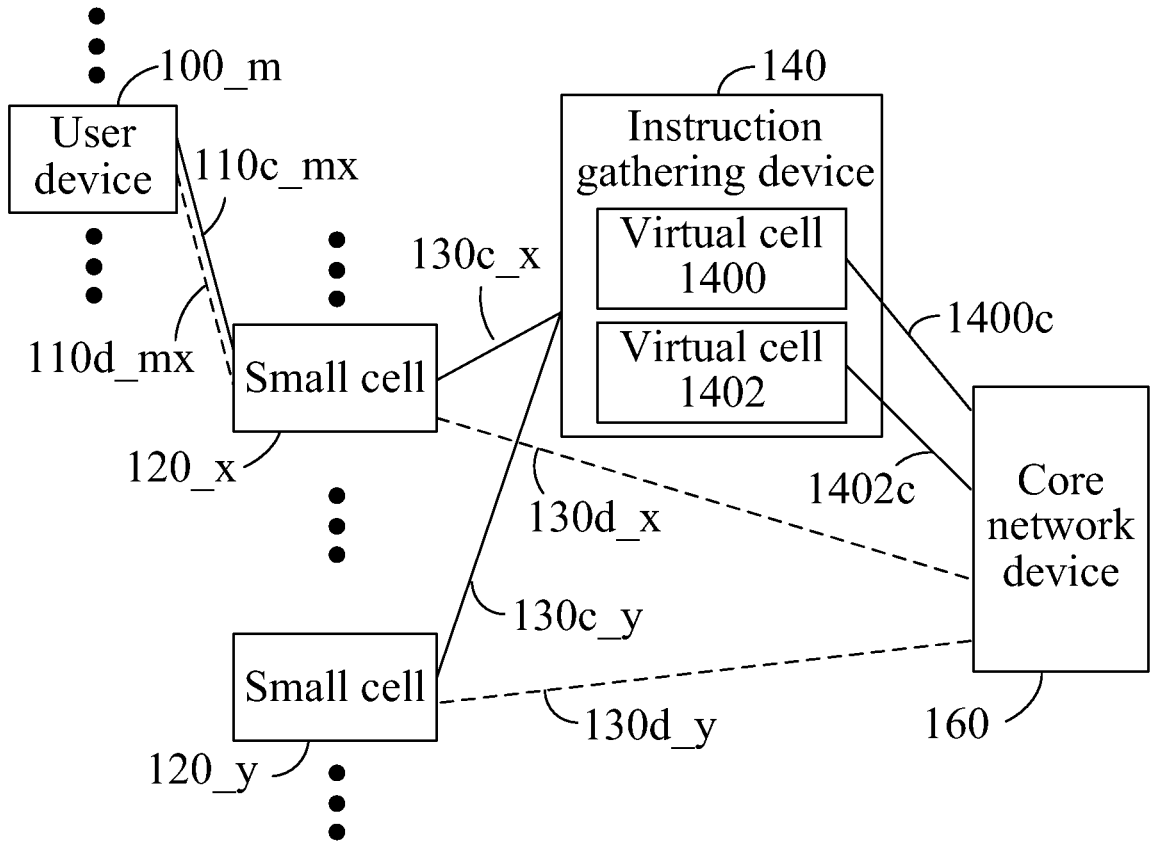
FIG. 1 is a schematic diagram illustrating a network system using small cells according to an embodiment of the present disclosure.

Please refer to FIG. 1, a schematic diagram illustrating a network system using small cells according to an embodiment of the present disclosure. As shown, a plurality of user devices (e.g. user device 100_m) are connected to the network through the network system 10. In this network system 10, there are at least two small cells (e.g. small cells 120_x and 120_y), an instruction gathering device 140 and a core network device 160.

In this embodiment, a control packet connection 100c_mx and a data packet connection 110d_mx are established between the user device 100_m and the small cell 120_x. The control packets are transmitted through the control packet connection 100c_mx, and the data packets are transmitted through the data packet connection 100d_mx. A control packet connection 130c_x is established between the small cell 120_x and the instruction gathering device 140 for transmission of the control packets. A data packet connection 130d_x is established between the small cell 120_x and the core network device 160 for transmission of the data packets. A control packet connection 130c_y is established between the small cell 120_y and the instruction gathering device 140 for transmission of the control packets. A data packet connection 130d_y is established between the small cell 120_y and the core network device 160 for transmission of the data packets.

Furthermore, the instruction gathering device 140 provides two virtual cells 1400 and 1402. A control packet connection 1400c is established between the virtual cell 1400 and the core network device 160 for transmission of the control packets, and another control packet connection 1402c is established between the virtual cell 1402 and the core network device 160 for transmission of the control packets. In particular, the core network device 160 considers that the control packet connection 1400c and the control packet connection 1402c are independent of each other. Therefore, the core network device 160 views the virtual cells 1400 and 1402 as two independent and separate cells.

According to the architecture of the network system 10, the control packets and the data packets sent from the user device 100_m are all transmitted to the small cell (e.g. small cell 120_x) connected thereto. The small cell 120_x will transmit the received control packets to the instruction gathering device 140 through the control packet connection 130c_x, and transmit the received data packets to the core network device 160 through the data packet connection 130d_x.

Every small cell is directly connected to the instruction gathering device 140. Thus, the small cell only sees the instruction gathering device 140 rather than the virtual cells provided by the instruction gathering device 140 no matter how many virtual cells are provided. In other words, the instruction gathering device 140 receives the control packets from a source small cell, and then assigns a selected virtual cell to process the control packets from the source small cell. The instruction gathering device 140 treats the other small cells in the same way. Taking the small cell 120_x as an example, the small cell 120_x transmits a control packet to the instruction gathering device 140 through the control packet connection 130c_x. For the small cell 120_x, the control packet is directly transmitted to the instruction gathering device 140 rather than any virtual cell 1400 or 1402. Then, the instruction gathering device 140 forwards the control packet received from the small cell 120_x to a selected virtual cell 1400 or 1402 according to a predetermined rule. Subsequently, the selected virtual cell 1400 or 1402 transmits the control packet, whose contents are partially replaced and changed adaptively, to the core network device 160.

Since the virtual cells are connected to the core network device 160 respectively without intercommunication between the virtual cells, the core network device 160 considers the virtual cells 1400 and 1402 as separate and independent cells. Accordingly, the core network device 160 processes the control packets transmitted through the control packet connection 1400c and control packet connection 1402c as the control packets transmitted from different cells. Then, the core network device 160 transmits corresponding reply packets back to the virtual cell 1400 and the virtual cell 1402 through the control packet connection 1400c and control packet connection 1402c, respectively. The virtual cells 1400 and 1402 also partially replace the contents of the reply packets sent from the core network device 160 adaptively, and than transmit the modified reply packets to the corresponding small cells in the name of the instruction gathering device 140. At last, the small cells decide the subsequent operation according to the reply packets transmitted from the instruction gathering device 140.

In brief, the instruction gathering device 140 partially replace or modify the contents of the control packets (including the above-mentioned reply packets) passing through the instruction gathering device 140 adaptively. The core network device 160 processes the control packets as it is connected to the virtual cells 1400 and 1402 rather than the instruction gathering device 140. On the other hand, the small cells are just in communication with the instruction gathering device 140 rather than a lot of virtual cells.

According to the above described procedure, the network system 10 can operate smoothly and provide sufficient performance.

The details of a method for gathering small cells used with the above-described network system 10 are further given.

Figure 2:
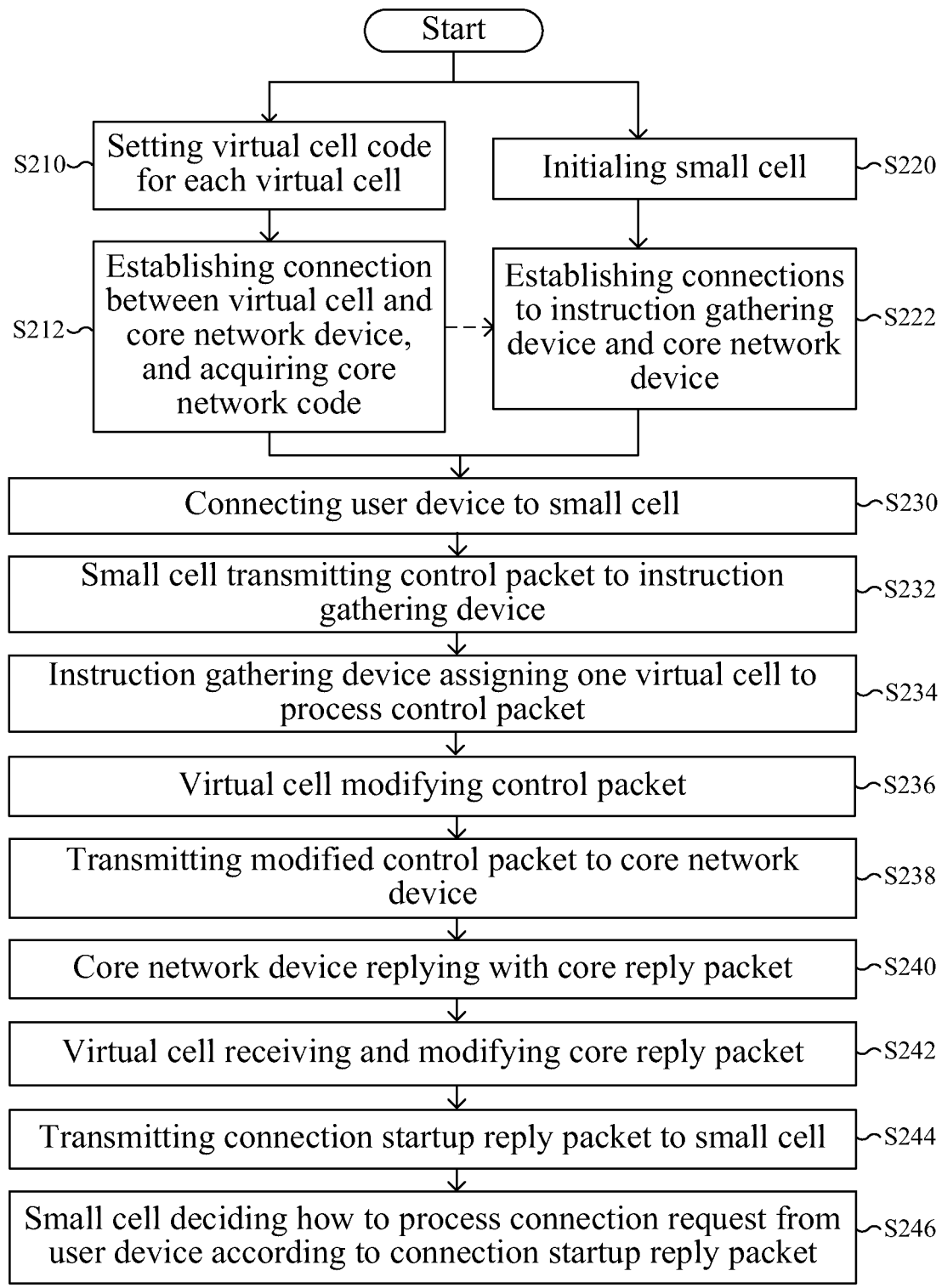
FIG. 2 is a flowchart illustrating a method for gathering small cells according to an embodiment of the present disclosure.

Please refer to FIG. 1 and FIG. 2 wherein FIG. 2 is a flowchart illustrating a method for gathering small cells according to an embodiment of the present disclosure. As shown in FIG. 2, initializing steps are performed at the beginning. The initializing steps involve the initialization of the instruction gathering device 140, the initialization of the small cells 120_x and 120_y, and the initialization of the connections among the core network device 160, the instruction gathering device 140 and the small cells 120_x and

102_y. It is to be noted that the initializing steps (steps S210-S222) are performed only when the network system 10 starts to operate or related hardware is rebooted. The initializing steps are not required every time the user device makes a connection request to the network system 10.

In the embodiment, the instruction gathering device 140 gives the virtual cell 1400 and 1402 respective virtual cell codes (step S210). Then, the virtual cells 1400 and 1402 take the corresponding virtual cell codes to establish connections to the core network device 160 (step S212). Taking the virtual cell 1400 as an example, the instruction gathering device 140 sets a virtual cell code VeNB 1 to represent the virtual cell 1400, and sets another virtual cell code VeNB 2 to represent the virtual cell 1402. Thus, when the virtual cell 1400 starts to establish a control packet connection 1400c to the core network device 160 based on Stream Control Transmission Protocol (SCTP), the virtual cell 1400 transmits the virtual cell code VeNB 1 to the core network device 160. Based on the same transmission protocol, the core network device 160 records the virtual cell code VeNB 1, and replies the virtual cell 1400 with its core network code (e.g. GUMMEI). Then, the virtual cell 1400 records the core network code GUMMEI for later use. By following the procedure, a control packet connection 1400c (hereinafter called first core network connection) is established between the virtual cell 1400 and the core network device 160. The established control packet connection 1400c can transmit network packets normally by any known transmission mechanism.

On the other hand, after a small cell is initialized in step S220, the initialized small cell need establish the control packet connection to the instruction gathering device 140 to transmit control packets, and establish the data packet connection to the core network device 160 to transmit data packets. Taking the small cell 120_x as an example, after being initialized, the small cell 120_x has its own cell code (e.g. HeNB 1, hereinafter called first cell code). When the small cell 120_x wants to establish a connection to the instruction gathering device 140 based on SCTP, the small cell 120_x puts the cell code HeNB 1 in the control packet, and transmits the control packet to the instruction gathering device 140. The instruction gathering device 140 assigns one virtual cell (e.g. virtual cell 1400) to process the control packet. In this condition, the virtual cell 1400 takes over the control packet from the instruction gathering device 140 and records the cell code HeNB 1 carried in the control packet. Then, the virtual cell 1400 replies the small cell 120_x with the previously recorded core network code GUMMEI rather than the virtual cell code VeNB 1. The small cell 120_x also records the core network code GUMMEI for later use. In other words, the instruction gathering device 140 takes the core network code GUMMEI as its code to establish the control packet connection to the small cell 120_x. By following the procedure, the control packet connection 130c_x is established between the instruction gathering device 140 and the small cell 120_x. The established control packet connection 130c_x can transmit network packets normally by any known transmission mechanism.

In addition to the control packet connection 130c_x established between the small cell 120_x and the instruction gathering device 140 for transmission of control packets, a data packet connection 130d_x is also established between the small cell 120_x and the core network device 160 for transmission of data packets. The data packet connection 130d_x can be established according to any known method, and details are not given herein.

In the embodiment, the instruction gathering device 140 provides two virtual cells 1400 and 1402. The virtual cell 1402 can establish a control packet connection 1402c (hereinafter called second core network connection) in a similar way to the control packet connection 1400c as described above. Further, another small cell (e.g. small cell 120_y) can establish a control packet connection (e.g. control packet connection 130c_y) and a data packet connection (e.g. data packet connection 130d_y) by referring the foregoing description. The instruction gathering device 140 can assign one virtual cell 1400 or 1402 to process the control packets sent from one small cell. No matter which virtual cell is selected, the small cell can establish the control packet connection to the instruction gathering device 140 by following the steps described in the embodiment.

After initializing the network system 10, all small cells (e.g. small cells 120_x and 120_y and other small cells in the network system 10) can start to process the network service requests from nearby user devices (e.g. user device 100_m). The user device 100_m is taken as an example, but multiple end user devices supported by the network system 10 can be respectively connected to the network system 10 in the same manner.

When approaching the small cell 120_x, the user device 100_m can try to enter the network system 10 through the small cell 120_x (step S230). To enter the network system 10, the user device 100_m sends an access request signal to the network system 10. After the small cell 120_x receives the access request signal, the small cell 120_x sends a corresponding connection startup control packet to the instruction gathering device 140 through the control packet connection 130c_x (step S232). As shown in FIG. 3A, the connection startup control packet based on SCTP includes fields of, in part, cell code, end user device code, server user device code and core network code. In the connection startup control packet transmitted from the small cell 120_x, the field of cell code is filled in with HeNB 1 representing the small cell 120_x; the field of end user device code is filled in with eNB UE S1AP 1 (cell user device code) provided by the small cell 120_x to represent the user device 100_m (hereinafter called activated user device) making the connection request; and the field of core network code is filled in with GUMMEI indicating that the core network device 160 is used at the server end. The field of server user device code is empty because this is the first time that the user device 100_m makes the connection request to the network system 10 after being initialized.

As mentioned above, the instruction gathering device 140 assigns the virtual cell 1400 to process the connection startup control packet which is transmitted from the small cell 120_x and indicates that the user device 100_m makes the connection request. Therefore, after receiving the connection startup control packet, the instruction gathering device 140 forwards the connection startup control packet to the virtual cell 1400 (step S234). After receiving the connection startup control packet, the virtual cell 1400 partially replaces the contents of the connection startup control packet (step S236). Referring to FIG. 4A, the virtual cell 1400 changes the field of cell code in the connection startup control packet from HeNB 1 into VeNB 1 (virtual cell code), and changes the field of end user device code from eNB UE S1AP 1 into GW UE S1AP 1 (virtual user device code). Similarly, the field of server user device code is empty because this is the first time that the user device 100_m makes the connection request to the network system 10 after being initialized. The field of core network code is kept GUMMEI to indicate that the core network device 160 is used at the server end.

After the connection startup control packet is partially replaced and modified, the virtual cell 1400 transmits the connection startup control packet with the replaced contents to the core network device 160 through the control packet connection 1400c (step S238). The core network device 160 processes the instruction carried by the connection startup control packet, and than replies the virtual cell 1400 with a core reply packet through the control packet connection 1400c (step S240). As shown in FIG. 4B, in the core reply packet, the fields of cell code, end user device code and core network code are unchanged, but the field of server user device code is filled in with MME UE S1AP 1 (core user device code) provided by the core network device 160 to represent the user device 100_m.

After receiving the core reply packet, the virtual cell 1400 partially replaces the contents of the core reply packet (step S242). Then, the core reply packet with the replaced contents is transmitted to the small cell 120_x, and the modified core reply packet is considered as a connection startup reply packet in response to the connection startup control packet (step S244). Referring to FIG. 3B, in the connection startup reply packet, the field of core network code is kept unchanged. With regard to other fields, the field of cell code is changed from VeNB 1 (virtual cell code) into HeNB 1 (cell code of small cell 120_x); the field of end user device code is changed from GW UE S1AP 1 (virtual user device code) into eNB UE S1AP 1 (cell user device code); and the field of server user device code is changed from MME UE S1AP 1 (core user device code) into GW UE S1AP 1 (virtual user device code).

At last, after receiving the connection startup reply packet, the small cell 120_x decides how to process the connection request made by the user device 100_m according to the contents of the connection startup reply packet (step S246).

After the user device 100_m is successfully connected to the network system 10, the small cell 120_y may substitute the small cell 120_x to process the network service requirement of the user device 100_m if the user device 100_m is moving toward the small cell 120_y. Under this condition, the network system 10 performs a handover process to switch between the small cells.

Figure 5:
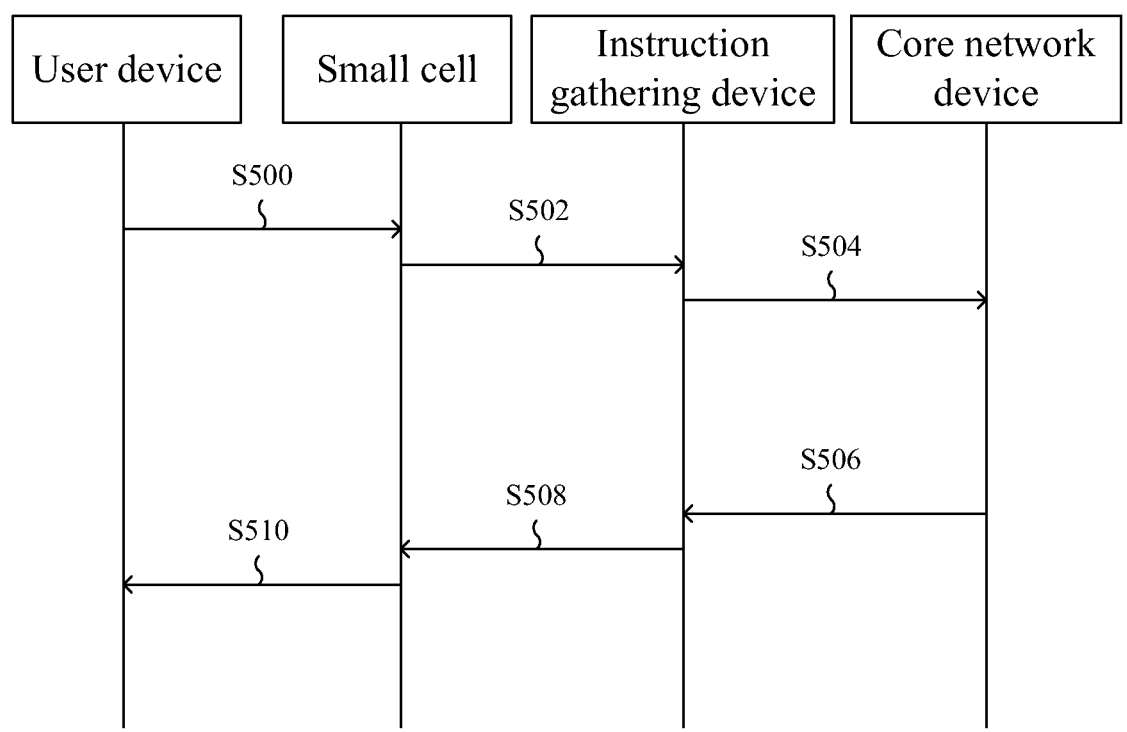
FIG. 5 illustrates a handover process conducted between small cells according to an embodiment of the present disclosure.

Please refer to FIG. 5 illustrating a handover process conducted between small cells according to an embodiment of the present disclosure, wherein the vertical axis represents time sequence and the horizontal axis represents logic sequence of devices. The handover process is conducted in the network system 10 of FIG. 1. The user device 100_m is taken as an example to show the handover from the small cell 120_x to the small cell 120_y. The handover process involves the connection establishment which has been described with reference to FIG. 2, and the similar steps are not repeated herein. Only steps other than those have been described with reference to FIG. 2 are addressed below.

In the embodiment, if the user device 100_m is closer to the small cell 120_y, or the small cell 120_y has greater signal strength than the small cell 120_x while responding to the user device 100_m, the user device 100_m will try to establish a connection to the small cell 120_y to substitute the small cell 120_x (step S500). Before the user device 100_m switches the connection from the small cell 120_x to the small cell 120_y, the small cell 120_y transmits a handover notification control packet to the instruction gathering device 140 through the control packet connection 130c_y (step S502). The handover notification control packet indicates that the user device 100_m is about to switch the connection to the small cell 120_y, and the contents of the handover notification control packet are partially shown in FIG. 6A.

In this embodiment, the fields used in the handover notification control packet are similar to those used in the connection startup control packet based on SCTP. In particular, in the handover notification control packet, the field of cell code is filled in with HeNB 2 representing the small cell 120_y; the filed of end user device code is filled in with eNB UE S1AP 2 (cell user device code) provided by the small cell 120_y to represent the user device 100_m making the connection request; the field of server user device code is filled in with GW UE S1AP 1 (virtual user device code) provided by the small cell 120_x and shown in FIG. 3B; and the field of core network code is still GUMMEI. The control packet based on SCTP does not record the small cells used before and after the handover process. Therefore, the instruction gathering device 140 recognizes the post-handover small cell (e.g. small cell 120_y) according to the filed of cell code in the handover notification control packet, and recognizes the pre-handover small cell (e.g. small cell 120_x) according to the filed of sever user device code in the handover notification control packet.

After step S502, the instruction gathering device 140 receives the handover notification control packet from the small cell 120_y. As known, the virtual user device code GW UE S1AP 1 recorded in the instruction gathering device 140 originally corresponds to the cell user device code eNB UE S1AP 1 (the filed of end user device code in FIG. 3B). Now in the handover notification control packet, the virtual user device code GW UE S1AP 1 corresponds to the cell user device code eNB UE S1AP 2 filled in the field of end user device code. Therefore, the instruction gathering device 140 can realize that the user device 100_m is about to switch the connection to the small cell 120_y indicated in a handover target field.

Before the handover process, the control packet related to the user device 100_m is processed by the virtual cell 1400. When the user device 100_m starts to switch the connection to another small cell, the instruction gathering device 140 will assign another virtual cell to process the control packet related to the user device 100_m as response. In the embodiment, the instruction gathering device 140 provides only two virtual cells so that the instruction gathering device 140 can only assign the virtual cell 1402 to process the control packet related to the user device 100_m. If more than two virtual cells are provided by the instruction gathering device 140, the instruction gathering device 140 can assign any virtual cell other than the virtual cell 1400 to process the control packet related to the user device 100_m. The selection of the virtual cells need not follow any specific sequence.

After the instruction gathering device 140 assigns the virtual cell 1402 to process the control packet related to the user device 100_m, the virtual cell 1402 will set a corresponding virtual user device code GW UE S1AP 2 for the user device 100_m, replaces the contents of the handover notification control packet, and transmits the handover notification control packet with the replaced contents to the core network device 160 through the control packet connection 1402c (step S504). As shown in FIG. 7A, the virtual cell 1402 changes the field of cell code in the handover notification control packet from HeNB 2 into VeNB 2 (virtual cell code), changes the field of end user device code in the handover notification control packet from eNB UE S1AP 2 (cell user device code) into GW UE S1AP 2 (virtual user device code), and change the field of server user device code in the handover notification control packet from GW UE S1AP 1 (virtual user device code) into MME UE S1AP 1 (core user device code).

Subsequently, the core network device 160 receives the modified handover notification control packet with the replaced contents from the virtual cell 1402, and replies the virtual cell 1402 with a handover confirmation packet after processing the modified handover notification control packet (step S506). The contents of the handover confirmation packet are partially shown in FIG. 7B. Referring to FIG. 7B, in the handover confirmation packet, the field of end user device code is filled in with GW UE S1AP 2 (virtual user device code), the field of core network code is filled in with GUMMEI, and the field of post-handover server user device code is filled in with MME UE S1AP 2 (post-handover core user device code).

The handover confirmation packet is transmitted to the virtual cell 1402, and the virtual cell 1402 partially replaces the contents of the handover confirmation packet as shown in FIG. 6B. Referring to FIG. 6B, the virtual cell 1402 changes the field of end user device code in the handover confirmation packet from GW UE S1AP 2 (virtual user device code) into eNB UE S1AP 2 (cell user device code), and changes the field of post-handover server user device code in the handover confirmation packet from MME UE S1AP 2 (post-handover core user device code) into GW UE S1AP 2 (virtual user device code). The core network code in the handover confirmation packet is kept unchanged.

After the contents of the handover confirmation packet are partially replaced, the instruction gathering device 140 transmits the handover confirmation packet with the replaced contents to the small cell 120_y (step S508). Then, the small cell 120_y is communicated with the user device 100_m according to the contents of the handover confirmation packet (step S510).

According to an aspect of the present disclosure, before the virtual cell transmits the control packet to the core network device, the virtual cell will modify the control packet by replacing the contents related to the small cell with the contents related to the corresponding virtual cell, and then transmit the modified control packet with the replaced contents to the core network device. On the other hand, before the virtual cell transmits the control packet to the small cell, the virtual cell will modify the control packet (e.g. the above-mentioned core reply packet) by replacing the contents related to the virtual cell with the contents related to the corresponding small cell.

According to another aspect of the present disclosure, based on the handover action, there are three types of control packets related to the end user device, including the handover notification control packet, the pre-handover control packets and the post-handover control packets. Firstly, the handover notification control packet is used to notify that the user device is about to switch the connection to another small cell. Secondly, the pre-handover control packets are control packets related to the user device and sent to the same small cell prior to the handover notification control packet. Thirdly, the post-handover control packets are control packets related to the user device and sent to the same small cell posterior to the handover notification control packet. As described above, the small cell for transmitting and processing the pre-handover control packets is different from the small cell for transmitting and processing the post-handover control packets.

According to the embodiments of the present disclosure, the user device 100_m can switch connections between small cells in a more convenient manner. When the user device 100_m switches the connected small cell, the instruction gathering device 140 also switches the virtual cells responsible for communication with the core network device 160 to respond to the switching action of the user device 100_m. For the core network device 160, such operation complies with the communication protocol, e.g. SCTP, so that the network system 10 can operate normally and stably.

According to the present disclosure, the method for gathering small cells switches the virtual cells provided by the instruction gathering device when the connection of the user device is switched to another small cell without interrupting the network service. If the switching does not result from an active switching instruction (e.g. disconnect first and then reconnect to another small cell), the switching action (i.e. the handover action) can be performed by following the steps described with reference to FIG. 2, FIG. 3A, FIG. 3B, FIG. 4A and FIG. 4B without switching the virtual cell. Furthermore, during forwarding the packet to the small cell or the core network device, the virtual cell changes and replaces the contents of the packet adaptively. Hence, the method for gathering small cells according to the present disclosure can provide effective communication method between network devices to achieve collaboration between these devices.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for gathering small cells adapted to be used with a network system comprising at least one user device, at least two small cells, a core network device and an instruction gathering device providing at least two virtual cells, wherein a plurality of control packets transmitted between the at least two small cells and the core network device pass through the instruction gathering device, and data packets transmitted between the at least two small cells and the core network device do not pass through the instruction gathering device, the method comprising a step of:

when a handover notification control packet of the plurality of control packets notifies that an activated user device switches connection from a first small cell to a second small cell other than the first small cell, all pre-handover control packets of the plurality of control packets prior to the handover notification control packet passing through a first virtual cell, and all post-handover control packets of the plurality of control packets posterior to the handover notification control packet passing through a second virtual cell other than the first virtual cell, wherein the virtual cells connected to the core network device are independent of each other so that the core network device processes connections from different virtual cells independently, wherein the instruction gathering device providing the first virtual cell and the second virtual cell performs steps of:

setting a first virtual cell code representing the first virtual cell and taking the first virtual cell code to establish a first core network connection between the first virtual cell and the core network device;

setting a second virtual cell code representing the second virtual cell and taking the second virtual cell code to establish a second core network connection between the second virtual cell and the core network device;

acquiring a core network code representing the core network device; and taking the core network code to represent the instruction gathering device to establish a connection between the first small cell and the instruction gathering device.

2. The method according to claim 1, wherein the at least two virtual cells comprise the first virtual cell and the second virtual cell, and the plurality of control packets comprises a first control packet, a second control packet and a third control packet in a sequence, wherein when the second control packet notifies that the activated user device switches the connection from the first small cell to the second small cell other than the first small cell, the first control packet is transmitted through the first virtual cell and the third control packet is transmitted through the second virtual cell.

3. The method according to claim 1, wherein the step of taking the core network code to represent the instruction gathering device to establish the connection between the first small cell and the instruction gathering device comprises steps of:

the instruction gathering device receiving a connection startup control packet from the first small cell, the connection startup control packet comprises:
a first cell code representing the first small cell; and
a cell user device code provided by the first small cell to represent the activated user device; and the instruction gathering device transmitting a connection startup reply packet to the first small cell in response to the connection startup control packet, the connection startup reply packet comprising:
the cell user device code; and
a virtual user device code provided by the instruction gathering device to represent the activated user device.

4. The method according to claim 3, wherein before the step of transmitting the connection startup reply packet to the first small cell in response to the connection startup control packet, the method further comprises steps of:

replacing contents of the connection startup control packet, comprising steps of:
replacing the first cell code in the connection start up control packet with the first virtual cell code; and
replacing the cell user device code in the connection start up control packet with the virtual user device code;

the first virtual cell transmitting the replaced connection startup control packet to the core network device;

the core network device generating a core reply packet in response to the replaced connection startup control packet transmitted from the instruction gathering device, the core reply packet comprising:
a core user device code provided by the core network device to represent the activated user device; and
the virtual user device code; and the instruction gathering device receiving the core reply packet and modifying the core reply packet to provide the connection startup reply packet, wherein the step of modifying the core reply packet to provide the connection startup reply packet comprising steps of:

replacing the virtual user device code in the core reply packet with the cell user device code; and
replacing the core user device code in the core reply packet with the virtual user device code.

5. The method according to claim 4, wherein the pre-handover control packets are transmitted through the first virtual cell, and the handover notification control packet is transmitted through the second virtual cell, wherein the handover notification control packet is transmitted to the instruction gathering device through the second small cell, and the handover notification control packet comprises a post-handover cell user device code, a second cell code representing the second small cell and the virtual user device code.

6. The method according to claim 5, wherein the handover notification control packet is transmitted through the second virtual cell by steps of:

the instruction gathering device replacing contents of the handover notification control packet after the instruction gathering device receives the handover notification control packet, comprising steps of:
replacing the virtual user device code in the handover notification control packet with the core user device code;
replacing the post-handover cell user device code in the handover notification control packet with the virtual user device code; and
replacing the second cell code in the handover notification control packet with the second virtual cell code; and transmitting the replaced handover notification control packet to the core network device through the second virtual cell.

7. The method according to claim 6, further comprising steps of:

the core network device receiving the replaced handover notification control packet and replying with a handover confirmation packet, the handover confirmation packet comprising a post-handover virtual user device code and a post-handover core user device code;

the instruction gathering device receiving the handover confirmation packet from the core network device;

replacing contents of the handover confirmation packet, comprising steps of:
replacing the post-handover virtual user device code in the handover confirmation packet with the post-handover cell user device code; and
replacing the post-handover core user device code in the handover confirmation packet with the post-handover virtual user device code; and transmitting the replaced handover confirmation packet to the second small cell.

8. A method for gathering small cells adapted to be used with a network system comprising at least one user device, at least two small cells, a core network device and an instruction gathering device providing at least two virtual cells, wherein control packets transmitted between the at least two small cells and the core network device pass through the instruction gathering device, and data packets transmitted between the at least two small cells and the core network device do not pass through the instruction gathering device, the method comprising steps of:

connecting the virtual cells to the core network device independently;

a first virtual cell transmitting the control packets to the core network device when an activated user device establishes a first connection to a first small cell; and a second virtual cell taking over the first virtual cell for transmitting the control packets to the core network device when the activated user device establishes a second connection to a second small cell other than the first small cell, the second virtual cell being other than the first virtual cell, wherein the first virtual cell replaces contents related to the first small cell in the control packets with contents related to the first virtual cell, and the first virtual cell transmits the replaced control packets to the core network device; and the second virtual cell replaces contents related to the second small cell in the control packets with contents related to the second virtual cell, and the second virtual cell transmits the replaced control packets to the core network device.

9. The method according to claim 8, wherein the at least two virtual cells comprise the first virtual cell and the second virtual cell, and the instruction gathering device performs steps of:

setting a first virtual cell code representing the first virtual cell and taking the first virtual cell code to establish a first core network connection between the first virtual cell and the core network device;

setting a second virtual cell code representing the second virtual cell and taking the second virtual cell code to establish a second core network connection between the second virtual cell and the core network device;

acquiring a core network code representing the core network device; and taking the core network code to represent the instruction gathering device to establish a connection between the first small cell and the instruction gathering device.

10. The method according to claim 9, wherein the step of taking the core network code to represent the instruction gathering device to establish the connection between the first small cell and the instruction gathering device comprises steps of:

the instruction gathering device receiving a connection startup control packet from the first small cell, the connection startup control packet comprises:
a first cell code representing the first small cell; and
a cell user device code provided by the first small cell to represent the activated user device; and the instruction gathering device transmitting a connection startup reply packet to the first small cell in response to the connection startup control packet, the connection startup reply packet comprising:
the cell user device code; and
a virtual user device code provided by the instruction gathering device to represent the activated user device.

11. The method according to claim 10, wherein before the step of transmitting the connection startup reply packet to the first small cell in response to the connection startup control packet, the method further comprises steps of:

replacing contents of the connection startup control packet, comprising steps of:
replacing the first cell code in the connection start up control packet with the first virtual cell code; and
replacing the cell user device code in the connection start up control packet with the virtual user device code;

the first virtual cell transmitting the replaced connection startup control packet to the core network device;

the core network device generating a core reply packet in response to the replaced connection startup control packet transmitted from the instruction gathering device, the core reply packet comprising:
a core user device code provided by the core network device to represent the activated user device; and
the virtual user device code; and the instruction gathering device receiving the core reply packet and modifying the core reply packet to provide the connection startup reply packet, wherein the step of modifying the core reply packet to provide the connection startup reply packet comprising steps of:
replacing the virtual user device code in the core reply packet with the cell user device code; and
replacing the core user device code in the core reply packet with the virtual user device code.

12. The method according to claim 11, wherein the pre-handover control packets are transmitted through the first virtual cell, and the handover notification control packet is transmitted through the second virtual cell, wherein the handover notification control packet is transmitted to the instruction gathering device through the second small cell, and the handover notification control packet comprises a post-handover cell user device code, a second cell code representing the second small cell and the virtual user device code.

13. The method according to claim 12, wherein the handover notification control packet is transmitted through the second virtual cell by steps of:

the instruction gathering device replacing contents of the handover notification control packet after the instruction gathering device receives the handover notification control packet, comprising steps of:
replacing the virtual user device code in the handover notification control packet with the core user device code;
replacing the post-handover cell user device code in the handover notification control packet with the virtual user device code; and
replacing the second cell code in the handover notification control packet with the second virtual cell code; and transmitting the replaced handover notification control packet to the core network device through the second virtual cell.

14. The method according to claim 13, further comprising steps of:

the core network device receiving the replaced handover notification control packet and replying with a handover confirmation packet, the handover confirmation packet comprising a post-handover virtual user device code and a post-handover core user device code;

the instruction gathering device receiving the handover confirmation packet from the core network device;

replacing contents of the handover confirmation packet, comprising steps of:
replacing the post-handover virtual user device code in the handover confirmation packet with the post-handover cell user device code; and
replacing the post-handover core user device code in the handover confirmation packet with the post-handover virtual user device code; and transmitting the replaced handover confirmation packet to the second small cell.

15. The method according to claim 8,
wherein the first virtual cell replaces the contents related to the first small cell in the control packets with the contents related to the first virtual cell by performing steps of:
- replacing a first cell code representing the first small cell in the control packets with a first virtual cell code representing the first virtual cell code; and
- replacing a first cell user device code representing the activated user device in the control packets with a first virtual user device code provided by the instruction gathering device to represent the activated user device, wherein the second virtual cell replaces the contents related to the second small cell in the control packets with the contents related to the second virtual cell by performing steps of:
- replacing a second cell code representing the second small cell in the control packets with a second virtual cell code representing the second virtual cell code; and
- replacing a second cell user device code representing the activated user device in the control packets with a second virtual user device code provided by the instruction gathering device to represent the activated user device.

16. The method according to claim 8, further comprising a step of:
the instruction gathering device transmitting a first reply packet in response to the control packets to the first small cell or the second small cell which transmits the control packets.

17. The method according to claim 16, further comprising a step of:
the instruction gathering device replacing contents of a core reply packet received from the core network device to generate the first reply packet.

18. The method according to claim 17, wherein the step of replacing the contents of the core reply packet to generate the first reply packet further comprises steps of:
- replacing the contents related to the first virtual cell in the core reply packet with the contents related to the first small cell, and replacing the contents related to the core network device in the core reply packet with the contents related to the first virtual cell; or
- replacing the contents related to the second virtual cell in the core reply packet with the contents related to the second small cell, and replacing the contents related to the core network device in the core reply packet with the contents related to the second virtual cell.

19. The method according to claim 18, wherein the core reply packet comprising a core user device code provided by the core network device to represent the activated user device, and a virtual user device code provided by the instruction gathering device to represent the activated user device,
wherein the instruction gathering device replaces the virtual user device code in the core reply packet with the cell user device code, and replaces the core user device code in the core reply packet with the virtual user device code.

* * * * *